Patented Mar. 10, 1942

2,276,094

UNITED STATES PATENT OFFICE 2,276,094

ALPHA, BETA-UNSATURATED PRIMARY ALCOHOL ESTERS OF SILICIC AND BORIC ACIDS

Henry S. Rothrock, Wilmington, Del., assignor to E. I. du Pont de Nemours & Company, Wilmington, Del., a corporation of Delaware No Drawing. Application August 24, 1939, Serial No. 291,753

12 Claims. (Cl. 260—80)

This invention relates to polymeric esters, and more particularly to polymeric esters of unsaturated alcohols with ortho acids of boron and silicon.

This invention has as an object the preparation of new resinous polymers. A further object is the preparation of new coating compositions. A still further object is the preparation of novel plastic, molding and casting compositions. Another object is the preparation of interpolymers of polymerizable organic compounds of the type hereinafter defined and esters of primary alcohols having an unsaturated linkage between the carbon next to the carbinol carbon and that once removed therefrom with ortho acids of boron and silicon. A still further object is to provide interpolymers possessing novel, white, enamel-like surfaces resistant to wear. A particular object of the invention is the provision of hard, tough, interpolymeric compositions. Other objects will appear hereinafter.

These objects are accomplished by the following invention which comprises polymeric esters of primary alcohols having an open chain unsaturated linkage between the carbon next to the carbinol carbon and that once removed therefrom, preferably those having a methylene (CH₂) group attached by an ethylenic double bond to the carbon next to the carbinol with inorganic ortho acids of boron and silicon and interpolymers thereof with other polymerizable materials, e. g., polymerizable organic compounds of the hereinafter described type. The polymeric compositions of the present invention are characterized in that they contain as a component or constituent or both a polymeric ortho-silicate or borate of a primary alcohol having an unsaturated linkage between the carbon next to the carbinol carbon and that once removed therefrom.

The monomeric esters may be readily prepared by ester interchange of the unsaturated alcohol with an ester of orthosilicic or orthoboric acid with a more volatile alcohol, or by reacting the unsaturated alcohol with boric acid. The esters of this invention do not polymerize alone under the ordinary conditions which are effective for the polymerization of vinyl or vinylidene compounds. Thus, tetramethallyl, tetraallyl, and tetracrotonyl silicates show no sign of polymerization after standing for periods up to six months at room temperature or four months at 65° C. Under these conditions ordinary vinyl compounds, e. g., vinyl acetate, styrene, vinyl chloride, etc., polymerize. After 2 months' standing at 65° C. in the presence of benzoyl peroxide, nitric acid or ammonium nitrate the above mentioned silicates are not noticeably polymerized. Boron trifluoride is ineffective in polymerizing tetramethallyl or tetraallyl silicates.

When the above mentioned unsaturated silicates and borates are mixed with an organic compound polymerizable under conditions which are effective in the polymerization of vinyl compounds, said compound having the general formula

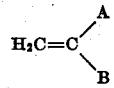

wherein A is hydrogen, alkyl, or a negative atom or group, and B is either hydrogen, an aliphatic hydrocarbon radical or a negative organic radical, at least one of A and B being negative polymerization occurs under conditions which are effective in the polymerization of vinyl compounds.

The more detailed practice of the present invention is illustrated by the following examples, wherein parts given are by weight unless otherwise stated.

Example I

A mixture of 124 parts of boric acid and 650 parts of methallyl alcohol is refluxed while an azeotropic mixture of water and methallyl alcohol is removed at 92° C. When the temperature rises to 112° C., the reaction mixture is fractionated at reduced pressure. Trimethallyl borate (415 parts) is collected at 91°–92° C. at 3–4 mm. pressure. The trimethallyl borate obtained is a crystalline solid melting at about 30° C.

Tricrotonyl borate, boiling at 108° C. at 3–5 mm. pressure is prepared similarly from boric acid and crotonyl alcohol.

Example II

Fifty parts of tributyl borate and 132 parts of furfuryl alcohol are refluxed together in the presence of a small amount of metallic sodium. After an hour of refluxing the pressure is reduced to 50 mm. and the liberated butyl alcohol slowly distilled off. The residue is then fractionally distilled and the fraction distilling at 172° C. at 5–6 mm. pressure is isolated. This fraction, 55 parts, is a clear, slightly viscous liquid identified as trifurfuryl borate by boron analysis.

A mixture of 19 parts of methyl methacrylate, 1 part of trifurfuryl borate and 0.2 part of benzoyl peroxide is allowed to stand at room temperature for 12 days and the mixture is then heated at 65° C. for 24 hours to complete the polymerization. The product thus obtained is clear, slightly yellow, hard, soluble in toluene and softens at 98° C. The borate units at the surface can be hydrolyzed by heating in water at 70° C. for 6 hours to give a slightly brown, enamel-like, surface.

*Example III*

A mixture of 95 parts of methyl methacrylate, 5 parts of trimethallyl borate and 0.1 part of benzoyl peroxide is polymerized to a syrup at 65° C. and then allowed to polymerize further at room temperature. The resulting clear, hard casting is polished to give a smooth surface. This casting is heated in water at 70–80° C. for about 8 hours, producing an article with a very white enamel-like surface sufficiently thick to permit gentle machining with pumice and rouge. The same effect is obtained by using tricrotonyl borate in place of trimethallyl borate.

Trimethallyl borate alone does not polymerize at room temperature even in the presence of 0.1% of such catalysts as benzoyl peroxide, sulfur dioxide, and stannic chloride.

A mixture of 28.5 parts of vinyl acetate, 1.5 parts of trimethallyl borate and 0.15 part of benzoyl peroxide is heated at 60° C. until it begins to thicken and then stored at room temperature until it solidifies. A clear, hard, water white casting is obtained which softens at 40° C. and which can be molded to a clear, tough article. Trimethallyl borate alone under the same conditions does not polymerize.

A mixture of 9.5 parts of methyl acrylate, 0.5 part of trimethallyl borate, 0.1 part of benzoyl peroxide is heated at 50° C. for 3 days. The product obtained is a clear, rubbery material which softens slightly below room temperature. Benzoyl peroxide under the same conditions does not catalyze the polymerization of unmodified trimethallyl borate.

*Example IV*

A mixture of 1176 parts of furfuryl alcohol, 312 parts of tetraethyl silicate and, 1.2 parts of litharge contained in a reactor fitted with a fractionating column is heated in an oil bath until 240 parts of distillate has come off. This distillate is poured back into the distilling flask and 520 parts of xylene are added. The bath is then kept at 145° C. while 373 parts of distillate, boiling below 83° C., is collected. Of this distillate, 262 parts is ethyl alcohol. The product is distilled in vacuo and the portion boiling at 204°–205° C. at 3 mm. pressure is collected. Carbon dioxide is passed through the mixture during the entire operation. On redistillation, 400 parts of tetrafurfuryl silicate boiling at 204–206° C. at 4 mm. pressure is obtained. This product, when crystallized from toluene-petroleum ether melts at 38–39° C. The common catalysts for vinyl polymerization, such as benzoyl peroxide, nitric acid, ammonium nitrate, boron trifluoride, and ascaridole (a terpene peroxide), have no effect in activating the polymerization of tetrafurfuryl silicate. In contrast stannic chloride catalyzes the polymerization of this compound.

A solution of linseed oil-Chinawood oil modified alkyd resin is cold blended with 2% of tetrafurfuryl silicate (based on solids) and films flowed out. When baked at 100° C. this mixture is superior in through-drying, and frost-resistance to linseed oil-Chinawood oil modified alkyd resins not containing tetrafurfuryl silicate, and the resulting films show improved hardness.

*Example V*

A small piece of sodium is added to a mixture of 460 parts of tetraethyl silicate and 1200 parts of methallyl alcohol contained in a reaction vessel fitted with an efficient fractionating column. This mixture is heated at such a rate that the distilling temperature remains at 78–80° C. After the theoretical amount of ethyl alcohol has distilled off the excess methallyl alcohol is recovered and the residue distilled under reduced pressure. The fraction boiling at 128–130° C. at 6 mm. is collected and identified as tetramethallyl silicate by the iodine number. The yield is 576 parts.

Tetraallyl silicate boiling at 114–116° C. at 13 mm. pressure; tetratiglyl silicate boiling at 158–160° C. at 4 mm.; and tetracrotonyl silicate boiling at 132–137° C. at 2–6 mm. pressure are prepared similarly from tetraethyl silicate and allyl alcohol, tiglyl alcohol, and crotonyl alcohol, respectively.

The usual vinyl polymerization catalysts have no appreciable action on tetramethallyl silicate after long periods of time. For example, in the presence of benzoyl peroxide there was no appreciable polymerization after heating at 65° C. for 1½ months. In the presence of ascaridol, there was partial polymerization to a clear soft, brittle gel only after 1½ months at 95° C.

Tetramethallyl silicate containing 10% of sulfur chloride ($S_2Cl_2$) polymerizes to a viscous liquid after 2 months heating at 65° C. Addition of a 15% solution of stannic chloride in chloroform to an equal volume of tetramethallyl silicate causes a violent reaction after a few minutes giving a hard, brittle, dark brown resin. When the amount of stannic chloride in the final resin is reduced to 1½%, tetramethallyl silicate polymerizes slowly to a yellow, brittle solid which is quite soft. When 1½ volumes of the stannic chloride-chloroform mixture is added to 1 volume of the silicate dissolved in 4 volumes of chloroform and cooled, dark brown resins are formed with tetraallyl, tetramethallyl, tetracrotonyl and tetratiglyl silicates. The concentration of stannic chloride in these resins is about 10%.

A linseed oil modified alkyd resin blended with 5% (based on solids) of tetramethallyl silicate gives films which when baked are harder and tougher than similarly treated films of the unmodified resin.

*Example VI*

One half gram of litharge is added to 288 parts of methallyl alcohol and 416 parts of tetraethyl silicate and the mixture is then heated under a fractionating column for 5 hours, during which time 181 parts of ethyl alcohol distill off. The temperature is allowed to rise to 110° C. at the start of the reaction and 20 parts of distillate is removed. This distillate is then poured back into the reactor and the distillation continued. The product is filtered through fuller's earth and then fractionated, collecting the fraction boiling at 84–85° C. at 4 mm. as diethyl dimethallyl silicate, and the fraction boiling at 89–94° C. at 44 mm. as ethyl trimethallyl silicate.

*Example VII*

A mixture of 2,400 parts of monomeric methyl methacrylate and 625 parts of monomeric tetramethallyl silicate is well mixed with 100 parts of partially polymerized methyl methacrylate and allowed to stand at room temperature for 10 days. The solidified mass is then kept at 65° C. for 1 day and finally at 95° C. for 1 day. The final product is a bubble-free solid mass, whereas a methyl methacrylate control is still liquid after 10 days standing.

Five parts of monomeric methyl methacrylate and 5 parts of tetramethallyl silicate containing 1% benzoyl peroxide are mixed with 90 parts of granular methyl methacrylate polymer and the mixture allowed to stand for 48 hours. The mixture is then charged into a die and molded by bringing the temperature and pressure slowly to 3,000 lbs. per sq. in. and 150° C., respectively, using a 12 minute cycle of which 5 minutes was required to reach the specified temperature and pressure. The molded chip softens at 94° C. and is insoluble in such organic solvents as benzene, toluene, dioxane, etc., which are active solvents for polymeric methyl methacrylate.

A granular interpolymer is obtained in a yield of 87% from a mixture of 99 parts of monomeric methyl methacrylate, 1 part of benzoyl peroxide and 1 part of tetramethallyl silicate by polymerizing with heating and with stirring in 200 parts of a 10% aqueous solution of a neutralized interpolymer of methyl methacrylate and methacrylic acid. Moldings of the polymers soften at 110° C. Following a similar procedure an interpolymer of methyl methacrylate (99 parts) and tetraallyl silicate (1 part) is obtained, moldings of which soften at 113° C., i. e., higher than methyl methacrylate polymer similarly prepared.

A solution comprising 80 parts of vinyl acetate, 20 parts of tetramethallyl silicate and 1 part of benzoyl peroxide on standing 1 week at 65° C. yields a clear, soft, brittle, solid which is insoluble in such organic solvents as benzene, toluene, dioxane, ethanol, etc., which normally dissolve polyvinyl acetate.

A solution comprising 40 parts of methoxyethyl methacrylate, 10 parts of tetramethallyl silicate, and 0.5 part of benzoyl peroxide is polymerized at 65° C. to give a clear, soft, polymer which adheres strongly to glass and is swollen by such organic solvents as toluene, dioxane, or butyl acetate to a very much lesser extent than unmodified methoxyethyl methacrylate polymer.

A mixture comprising 90 parts of monomeric methyl methacrylate and 10 parts of tetramethallyl silicate was heated to gentle reflux until it had polymerized to a viscous liquid. Films cast on glass from this syrup and baked first at 65° C. and then at 95° C. are insensitive to water and show good adhesion to glass. Similar results are obtained when tetraallyl, tetratiglyl, and tetracrotonyl silicates are used in place of the tetramethallyl silicate in the above experiment.

While the examples illustrate esters of certain readily available alcohols, the invention is generic to polymeric esters of primary alcohols having an unsaturated linkage between the carbon next to the carbinol carbon and that once removed therefrom, e. g., methallyl alcohol, allyl alcohol, furfuryl alcohol, crotonyl alcohol, tiglyl alcohol, allene carbinol, 3-chlorobutene-2-ol-1, hexadiene-2,4-ol-1, 3,7 - dimethyloctadiene-2,7-ol-1, propargyl alcohol, etc. It is preferred, however, that the esters be of aliphatic alcohols having not more than 18 carbon atoms and having at least 1 double bond for each 6 carbon atoms. Esters of primary aliphatic alcohols having a methylene (CH₂) group attached by an ethylenic double bond to the carbon next to the carbinol carbon are preferred.

As indicated above, the monomeric unsaturated esters of this invention may be made by ester interchange of the unsaturated alcohol and an ester of orthosilicic or orthoboric acid with a more volatile alcohol.

In general, a readily available ester of orthosilicic or orthoboric acid, e. g., tetraethyl silicate, tributyl borate, etc., may be used. The ester is so chosen that the alcohol component is more volatile than the unsaturated alcohol used. The corresponding sodium alcoholate has been found to be a good catalyst for this ester interchange and is introduced by adding a small amount of sodium to the reaction mixture. Other basic catalysts such as calcium oxide, magnesium oxide, etc., may also be used. The usual acidic catalysts for ester interchange cannot be used when the unsaturated alcohol is sensitive to acids. The ester may in some cases be made directly from the acid, e. g., in the case of the borates.

The unsaturated primary alcohol silicates and borates of this invention may be polymerized in the unmodified form only with extreme difficulty, since the ordinary catalysts which are effective in the polymerization of vinyl or vinylidene compounds are generally ineffective.

The preferred modification of the invention is that wherein the monomeric unsaturated ortho silicates and borates are interpolymerized with another polymerizable substance, for example, a polymerizable organic compound having the general formula

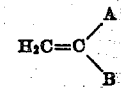

wherein A is hydrogen, alkyl, or a negative atom or group, e. g., chlorine, carboxy, etc., and B is either hydrogen, an aliphatic hydrocarbon radical, e. g., alkyl, cycloalkyl, or a negative organic radical, e. g., aryl, vinyl, cyano, acyl, acyloxy, aryloxy, carboalkyloxy, carboaryloxy, carboxy, etc. Examples of such compounds are styrene, butadiene, chloro-2-butadiene-1,3, vinyl chloride, methyl methacrylate, methyl acrylate, vinyl acetate, vinyl propionate, vinyl thioacetate, ethyl methacrylate, cyclohexyl methacrylate, cyclohexyl phenyl methacrylate, acrylonitrile, methacrylonitrile, methacrylic acid, methacrylamide, methacrylic anilide, vinyl butyrate, N-alkyl methacrylamides, N - alkylacrylamides, vinyl acrylate, ethyl acrylate, butyl methacrylate, octyl methacrylate, dodecyl methacrylate, methyl vinyl ketone, ethyl vinyl ether, butyl vinyl ether, etc.

In place of the polymerizable negatively substituted organic compounds mentioned above the silicates and borates of this invention may also be interpolymerized with polyhydric alcohol esters of drying oil acids, including drying oils, drying oil modified alkyd resins, etc.

The proportion by weight of the monomeric compound used in the preparation of the interpolymers may be varied over fairly wide limits. For example, while the percentage of trimethallyl borate may be varied between 1 and 50% to give clear, water-white, resins, interpolymers of methyl methacrylate and tricrotonyl borate are incompatible if the concentration of tricrotonyl borate exceeds 15%.

In the preparation of articles cast by bulk polymerization of an unsaturated silicate or borate with a polymerizable organic compound of the previously described type, the amount of ester that can be introduced may be varied widely depending on the results desired.

The softening temperature of the interpolymer in general decreases as the proportion of unsaturated silicate or borate is increased. Although good castings can be obtained from ethyl methacrylate-unsaturated silicate mixtures in relatively short periods of time without the addition of one of the usual polymerization catalysts, small amounts of these catalysts may be added to shorten the polymerization period. The interpolymerization may be carried out under any of the conditions well known to the art. Interpolymerization by exposure to actinic light at room temperature or elevated temperatures or the use of either atmospheric or superatmospheric pressure can be employed. A granular interpolymer is obtained when the polymerization is carried out with vigorous agitation in a liquid medium which is a non-solvent for the polymer. In such instances, and particularly when the non-solvent is water, it is preferred to carry out the polymerization in the presence of a granulating agent at the boiling point of the mixture, but the use of a lower or higher temperature is not precluded.

In addition to incorporation with linseed oil-China-wood oil and linseed oil modified alkyd resins the unsaturated silicate may be incorporated in other drying oil compositions used in the manufacture of coating compositions. Drying oils such as oiticica oil, dehydrated castor oil or soya bean oil may be used. The amount of unsaturated silicate used may be varied from 1 to 40% on the basis of solids in the composition.

The selection of the components and the relative amounts of each used depends on the physical properties desired in the interpolymer. For example, interpolymers of trimethallyl borate and methyl methacrylate having less than 10% of the former material have softening points around 100° C. and are as clear and hard as polymeric methyl methacrylate. If greater resistance to organic solvents and crazing is desired, the concentration of trimethallyl borate can be increased to 40%, at some sacrifice in softening point. By interpolymerizing suitable proportions of methyl methacrylate with an unsaturated borate or silicate hard tough castings can be obtained which will form glossy, white enamel-like coatings when heated in the presence of water.

The interpolymerization may be conducted by several well-known methods for example, the components may be polymerized in bulk without added diluent in a tightly closed vessel having any desired form. This may be accomplished by heating in the temperature range of 60–100° C. until a thick liquid is formed and then allowing this to solidify at room temperature to avoid bubble formation or the whole process may be carried out at room temperature. The products obtained by these methods are usually clear, bubble-free masses having the shape of the container in which they are cast. Polymerization can be effected in the presence of an organic diluent, if desired.

In the above described methods for interpolymerizing the products of this invention, polymerization catalysts such as benzoyl peroxide may be used. Other polymerization catalysts such as ozone, dibutyryl peroxide, perphthalic acid, peracetic acid, dibutyryl peroxide, lauroyl peroxide, succinyl peroxide and the like function satisfactorily. The catalyst concentration may be varied in the range of 0.1 to 2% but the range of 0.1 to 1% is preferred. Lower concentrations of catalyst and lower temperatures (35° to 50° C.) may be used if desired. The time required for the polymerization is largely dependent upon the conditions used, the concentration of unsaturated silicate or borate and catalyst and may vary from a few hours to several days.

Interpolymers containing the polymeric unsaturated alcohol borates and silicates of this invention are useful in the preparation of products having white enamel-like surfaces of exceptional appearance.

The present invention affords new and useful interpolymeric materials having striking properties. The greatest utility of the invention is in the field of interpolymerization wherein it offers a novel means for modifying and improving polymers made from the polymerizable organic compounds hereinbefore defined. In contrast to the polymers of straight polymerizable organic compounds, these insolubilized resins, which have retained hardness and toughness, may be used in contact with organic solvents. The interpolymers show improvement in craze resistance, provided the concentration of unsaturated ortho esters is sufficiently high.

The unsaturated silicates provide a means of producing insoluble interpolymers when polymerized with a number of polymerizable materials. Whereas many of the substances usually used to bring about cross linking polymerize very readily alone and in some cases cannot be stored without inhibitors, the unsaturated silicates and borates can be stored indefinitely without any danger of polymerization.

The addition of tetramethallyl silicate to methyl methacrylate causes the polymerization to proceed at an even rate and decreases the formation of bubbles during the casting operation. The unsaturated silicates also have a catalytic effect on the polymerization of methyl methacrylate since mixtures containing them polymerize more readily than does methyl methacrylate alone.

As pointed out above, the interpolymers of this invention have improved resistance to crazing. Resistance to crazing is determined by allowing acetone to evaporate at room temperature from the surface of a shaped piece of the product and examining the surface after evaporation of the acetone. If the surface shows minute irregular surface cracks, it is said to craze while if free from such cracks, it is said to be non-crazing. An organic solvent such as acetone when applied to polymeric methyl methacrylate causes crazing, but interpolymers containing 10–20% of tetramethallyl silicate or borate are resistant to this solvent.

The unsaturated esters of this invention, particularly tetrafurfuryl silicate and tetramethallyl silicate when added to China-wood oil modified alkyd resin in amounts varying from 5–20% (based on solids) give a better degree of final hardening, better through-drying and greater frost resistance than untreated control films under the same conditions. Improvement of film properties is especially pronounced in baked systems. Baked films from China-wood oil modified alkyd resins containing 5–20% of tetrafurfuryl silicate show less under-rusting than untreated controls after 6 months outdoor exposure.

The above description and examples are intended to be illustrative only. Any modification of or variation therefrom which conforms to the spirit of the invention is intended to be included within the scope of the claims.

I claim:

1. A polymeric ester of an inorganic ortho acid of an element of the class consisting of boron and silicon with a primary alcohol having an open chain unsaturated linkage between the carbon next to the carbinol carbon and the carbon once removed therefrom.

2. A polymeric ester of an inorganic ortho acid of an element of the class consisting of boron and silicon with a primary alcohol having a methylene ($CH_2$) group attached by an ethylenic double bond to the carbon next to the carbinol carbon.

3. An interpolymer of an ester of an inorganic ortho acid of an element of the class consisting of boron and silicon with a primary alcohol having an open chain unsaturated linkage between the carbon next to the carbinol carbon and the carbon once removed therefrom, interpolymerized with an organic compound selected from the class consisting of polymerizable vinyl and vinylidene compounds.

4. An interpolymer of a borate of a primary alcohol having an open chain unsaturated linkage between the carbon next to the carbinol carbon and the carbon once removed therefrom with an organic compound selected from the class consisting of polymerizable vinyl and vinylidene compounds.

5. An interpolymer of a borate of a primary alcohol havin a methylene ($CH_2$) group attached by an ethylenic linkage to the carbon next to the carbinol carbon with an organic compound selected from the class consisting of polymerizable vinyl and vinylidene compounds.

6. An interpolymer of a silicate of a primary alcohol having an open chain unsaturated linkage between the carbon next to the carbinol carbon and the carbon once removed therefrom with an organic compound selected from the class consisting of polymerizable vinyl and vinylidene compounds.

7. An interpolymer of a silicate of a primary alcohol having a methylene ($CH_2$) group attached by an ethylenic linkage to the carbon next to the carbinol carbon with an organic compound selected from the class consisting of polymerizable vinyl and vinylidene compounds.

8. An interpolymer of tetramethallyl silicate with an alkyl methacrylate.

9. An interpolymer of tetramethallyl silicate with methyl methacrylate.

10. An interpolymer of trimethallyl borate with an alkyl methacrylate.

11. An interpolymer of trimethallyl borate with methyl methacrylate.

12. Polymeric tetraallyl silicate.

HENRY S. ROTHROCK.